Figure 1:
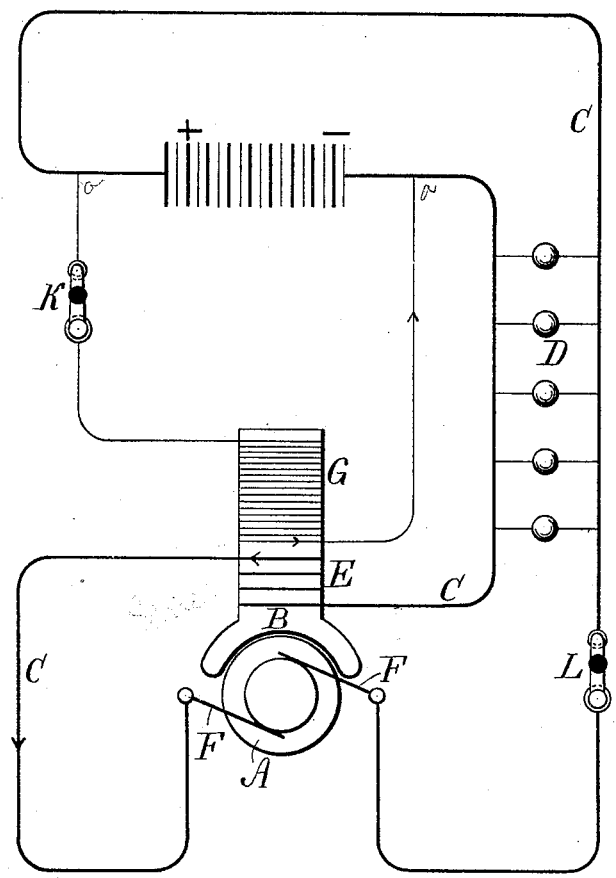

No. 613,406. Patented Nov. 1, 1898.
W. BIDDLE.
ELECTRIC CAR LIGHTING.
(Application filed May 14, 1894.)

(No Model.) 2 Sheets—Sheet 1.

Witnesses:
J. Staib
Geo. T. Pinckney

Inventor:
William Biddle
per Lemuel W. Serrell
Atty.

THE NORRIS PETERS CO., PHOTO-LITHO., WASHINGTON, D. C.

No. 613,406. Patented Nov. 1, 1898.
W. BIDDLE.
ELECTRIC CAR LIGHTING.
(Application filed May 14, 1894.)
(No Model.) 2 Sheets—Sheet 2.
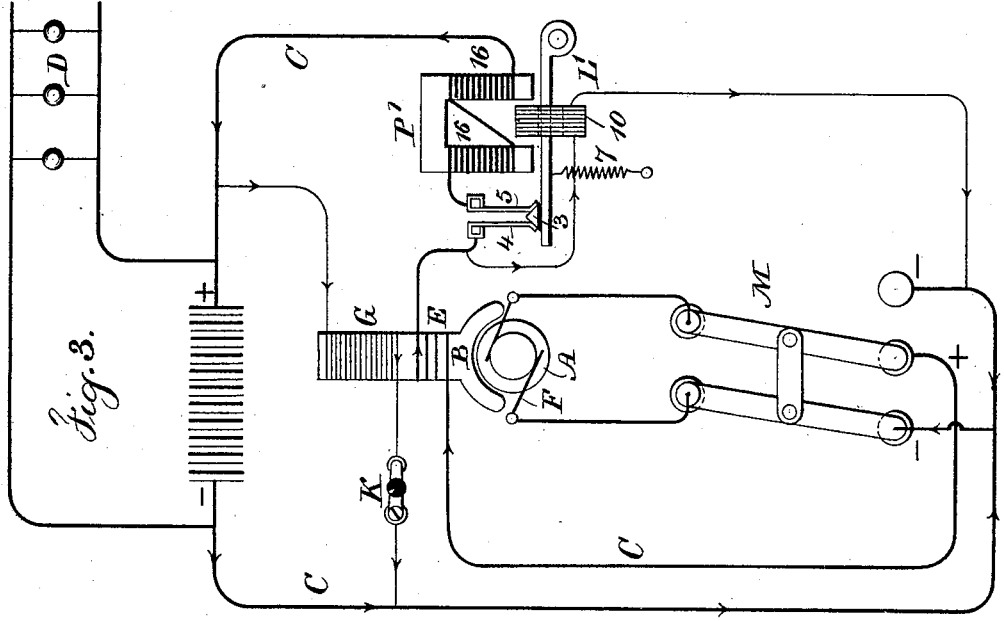
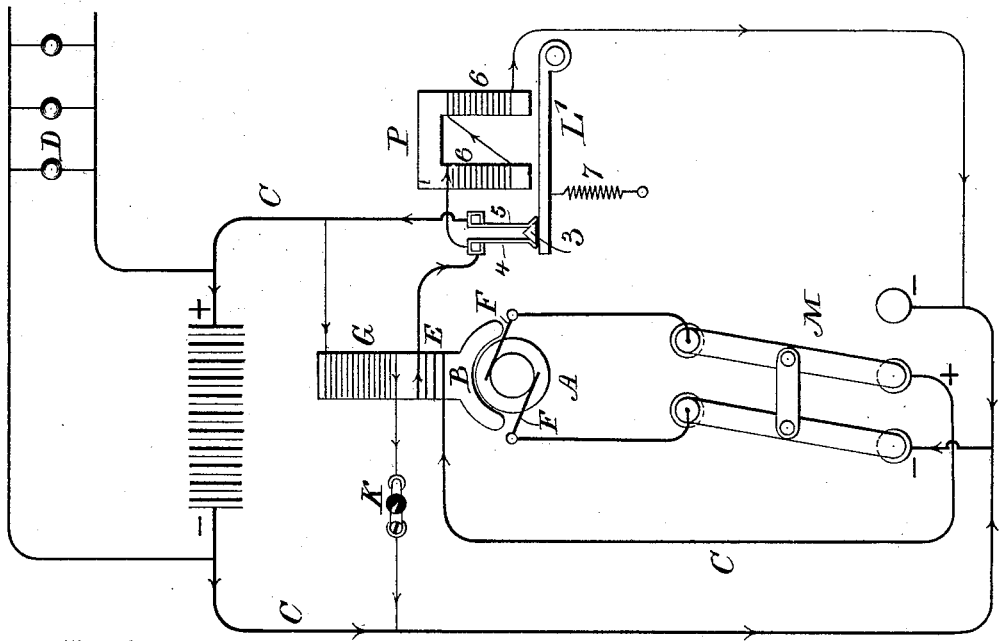
WITNESSES: Frank S. Ober, Chas. H. Smith
INVENTOR William Biddle
BY Lemuel W. Serrell
ATTORNEY

UNITED STATES PATENT OFFICE.

WILLIAM BIDDLE, OF NEW YORK, N. Y., ASSIGNOR TO THE AMERICAN RAILWAY ELECTRIC LIGHT COMPANY, OF SAME PLACE.

ELECTRIC CAR-LIGHTING.

SPECIFICATION forming part of Letters Patent No. 613,406, dated November 1, 1898.

Application filed May 14, 1894. Serial No. 511,073. (No model.)

*To all whom it may concern:*

Be it known that I, WILLIAM BIDDLE, a citizen of the United States, residing at New York, (Brooklyn,) in the county of Kings and State of New York, have invented an Improvement in Electric Car-Lighting, of which the following is a specification.

The field-helices in a dynamo have been so wound that a small portion is in a shunt of the main circuit in multiple arc with the translating devices for regulating the generative capacity of the machine. In dynamos having translating devices in series more or less of an opposing or secondary helix has been brought into action, according to the resistance of the translating devices.

In lighting railway-cars by incandescent electric lamps in multiple arc the resistance of the working circuit is substantially uniform; but the armature of the dynamo receiving its motion from one of the car-axles is subject to greatly varying speeds.

To adapt a dynamo to car-lighting under the conditions existing, I place one portion of the field-helix in a shunt between the brushes and the other and oppositely-wound portion in series in the main circuit that contains the translating devices and the armature in multiple arc, so that the potential of current will be nearly uniform, regardless of the speed of the armature.

In order to maintain the lamps when the car is standing still, I add a secondary or storage battery in the main circuit in series with the field-coil, and to prevent the secondary battery energizing the field-helix a switch is used and another switch in the armature-circuit, so that the secondary battery is charged when the armature-voltage exceeds that of the secondary battery and the latter energizes the lights when the dynamo stops or is insufficient.

When the car is to be run first in one direction and then in the other, a three-point or commutating switch is used to render the direction of current uniform at the secondary battery, and the switch in the armature-circuit is rendered automatic by an electromagnet, either plain or polarized, to break the said circuit to the secondary battery when the potential of the armature falls below that of the secondary battery.

In the drawings, Figure 1 represents the elementary feature with the storage battery and hand-switches. Fig. 2 is a diagram of the elementary feature with a three-point switch or circuit-changer and a magnetic circuit-breaking switch, and Fig. 3 shows the same devices with a polarized switch.

Let A represent an armature of any desired character that is to be rotated at varying speeds, such as by a connection to a car-axle; B, the field-magnet; C, the main-circuit wires, and D the incandescent lamps in multiple arc. The portion E of the field-helices is in series in the main line with the brushes F and armature A; but the portion G of the field-helices, which is wound the reverse to oppose the helix E, is in a shunt between the brushes and the turns or coils, and the relative sizes of the wires and their resistances are to be proportioned, as well known, so that the lines of magnetism of the field-magnet set up by the main-line circuit in the series helix E will cut down or proportionately neutralize the lines of magnetism set up by the current flowing through the helix G, according to the increase of potential due to increased speed of the armature or the reverse, so that when the speed lessens the lines of magnetism from the field-magnet and which are cut by the armature will be increased, and as the speed of the armature increases the lines of magnetism will be lessened in proportion, so as to render nearly uniform the voltage in the working circuit under varying speeds within given limits.

In Fig. 1 the storage or secondary battery is shown in the main circuit in series with the armature and the actuating-coil E of the field-magnet, and the helix G is in a shunt to both the secondary battery and the armature-circuit, so that when the potential of the armature exceeds that of the storage battery the latter will be charged, and this will be effected without disturbing the incandescent lamps or other translating devices in the working circuit, and in proportion as the speed increases of the armature and the voltage rises in the armature-circuit so the helix E will act to neutralize or cut down the effective magnetism of the field-magnets and render the electromotive force in the main circuit nearly uniform under different speeds.

The switch at K serves to break the circuit and prevent the storage battery maintaining magnetism in the field-magnet B, and the switch at L serves to break the armature-circuit and prevent the storage battery discharging through the same.

In Fig. 2 devices are shown that act the same as before described, except that when the apparatus is fitted to a car that will be run first in one direction and then in the other a three-point or commutating switch is used, as shown at M, and the same may be moved by hand or automatically, as shown in Letters Patent No. 517,998, granted April 10, 1894, to Biddle and Kennedy, the object of this commutating-switch being to cause the current to flow in the proper direction through the secondary battery and through the reverse-wound helix of the field-magnet when the armature is being rotated in either one direction or the other.

To break the main circuit through the armature when the rotation thereof stops or the electromotive force drops below that of the secondary battery, a magnetic switch L' acts automatically. In this the armature-circuit closer 3 is between the springs 4 and 5, and when in contact closes the armature-circuit through the helix E and secondary battery, and there is a branch or shunt containing the helices 6 of the electromagnet P, so that the armature is held by such magnet; but as soon as the slower rotation of the armature lessens the electromotive force the secondary battery reacts to neutralize the magnetism of P, and the spring 7 breaks contact between 3 and 4 5 and breaks the armature-circuit to the secondary battery; but the helices 6 being in an unbroken shunt of the armature the contact 3 is closed as soon as the electromotive force of the armature rises and the magnet P overcomes the spring.

In Fig. 3 the switch L' is actuated by a polarized magnet instead of the ordinary electromagnet P, Fig. 2. The coils 16 of the magnet P' are in the main circuit through the springs 4 and 5, and the polarizing-coil 10 for the armature is in the shunt of the main circuit through the armature, so that when the armature is rotating at its normal speed the polarity of the armature and of the electromagnet P' attract, and as soon as the electromotive force of the armature sinks below that of the secondary battery the latter, reacting through the coil 10, reverses the polarity of the armature, and the same is repelled and the contact at 3 4 5 is broken, breaking the main circuit of the armature and secondary battery. When the speed of the armature is augmented, the armature is polarized attractively and the circuit at 3 4 5 again closed.

In the aforesaid patent, No. 517,998, filed April 20, 1893, the secondary battery, the commutating-switch, and a magnetic switch to break the armature-circuit are represented. In my present improvement the reverse winding of the field-magnet is applied as an improvement to unify the output of current under varying speeds of the armature.

I claim as my invention—

1. The combination in a system for lighting cars, of a dynamo having an armature rotated by a connection to the car-axle, an external circuit from the commutator containing incandescing lamps in multiple arc, a secondary battery in series in the external or working circuit, a helix of the field-magnet in a shunt to the secondary battery and a reverse-wound helix in the main circuit for unifying the action of the dynamo under varying speeds of rotation of the armature, substantially as set forth.

2. The combination in a system for lighting cars, of a dynamo having an armature rotated by a connection to the car-axle, an external circuit from the commutator containing incandescing lamps in multiple arc, a secondary battery in series in the external or working circuit, a helix of the field-magnet in a shunt to the secondary battery and a reverse-wound helix in the main circuit for unifying the action of the dynamo under varying speeds of rotation of the armature, and a switch for breaking the circuit to the armature and preventing the secondary battery discharging through the armature, substantially as specified.

3. The combination in a system for lighting cars, of a dynamo having an armature rotated by a connection to the car-axle, an external circuit from the commutator containing incandescing lamps in multiple arc, a secondary battery in series in the external or working circuit, a helix of the field-magnet in a shunt to the secondary battery and a reverse-wound helix in the main circuit for unifying the action of the dynamo under varying speeds of rotation of the armature, a switch for breaking the circuit to the armature and preventing the secondary battery discharging through the armature, and a switch in the shunt to the secondary battery containing one of the field-helices, substantially as set forth.

4. The combination in a system for lighting cars, of a dynamo having an armature rotated by a connection to the car-axle, an external circuit from the commutator containing incandescing lamps in multiple arc, a secondary battery in series in the external or working circuit, a helix of the field-magnet in a shunt to the secondary battery and a reverse-wound helix in the main circuit for unifying the action of the dynamo under varying speeds of rotation of the armature, and an electromagnetic switch for breaking the circuit to the armature and preventing the secondary battery discharging through the armature, substantially as specified.

5. The combination in a system for lighting cars, of a dynamo having an armature rotated by a connection to the car-axle, an external circuit from the commutator containing incandescing lamps in multiple arc, a secondary battery in series in the external or working circuit, a helix of the field-magnet in a shunt to the secondary battery and a reverse-wound helix in the main circuit for unifying the action of the dynamo under varying speeds of rotation of the armature, and a polarized electromagnetic switch for breaking the circuit to the armature and preventing the secondary battery discharging through the armature, substantially as specified.

Signed by me this 12th day of May, 1894.

WILLIAM BIDDLE.

Witnesses:
   GEO. T. PINCKNEY,
   WILLIAM G. MOTT.